PROCESS OF MAKING A METAL LIGNIN SULPHONATE

Filed Sept. 2, 1938

METHOD #1.

- HARDWOOD SAWDUST
- TREAT WITH MINERAL ACID
  - FILTRATE DISCARDED → TANNINS, CARBOHYDRATES, SUGARS, RESINS
  - RESIDUE

METHOD #2.

- HARDWOOD SAWDUST
- TREAT WITH CAUSTIC
  - FILTRATE DISCARDED → TANNINS, CARBOHYDRATES, SUGARS, RESINS
  - RESIDUE

---- FROM THIS POINT METHODS ARE IDENTICAL ----

- SULFONATION IN $H_2SO_3$ OR SOLUTION CONTAINING FREE $SO_2$
  - RESIDUE DISCARDED → CELLULOSE
  - FILTRATE
- EVAPORATED TO APPROXIMATELY ½ VOLUME
- PRECIPITATION $H_2SO_4$ ADDED
  - FILTRATE DISCARDED → IMPURITIES AND $H_2SO_4$ SOLUTION
  - PRECIPITATE
- LIGNIN SULFONIC ACID

ALTERNATIVE TREATMENT

- ADDITION OF $H_2O$ TO DISSOLVE PRECIPITATE
- NEUTRALIZATION AND PRECIPITATION BY ADDITION OF METAL HYDROXIDE
  - FILTRATE DISCARDED
  - PRECIPITATE
- METAL SULFONATE OF LIGNIN SULFONIC ACID

INVENTORS
Howard B. Birt
William C. Pritchard
Robert A. Daily
Spencer Hardway
ATTORNEYS Patented May 13, 1941

2,241,627

UNITED STATES PATENT OFFICE 2,241,627

PROCESS OF MAKING A METAL LIGNIN SULPHONATE

Howard B. Birt, William C. Pritchard, and Robert A. Daily, Muncie, Ind., assignors to General Motors Corporation, Detroit, Mich., a corporation of Delaware Application September 2, 1938, Serial No. 228,182

4 Claims. (Cl. 260—124)

This invention relates to an addition agent for use in the manufacture of storage battery paste and is particularly concerned with an addition agent obtained from the chemical treatment of hardwood and to the method of making said addition agent.

An object of the invention is to provide a method whereby the lignin of hardwood may be sulphonated and then obtained in the substantially pure state for subsequent use in storage battery paste.

It is a further object of the invention to provide a method for sulphonating certain desirable constituents in hardwood and separating these constituents from the remaining constituents of the wood, such sulphonated constituents being used as addition agents in the paste of the negative battery plate for inhibiting, or greatly retarding, crystal growth of the sponge lead.

A still further object of the invention is to provide an addition agent to be incorporated in the paste of the negative plate of lead storage batteries for inhibiting or substantially preventing the crystal growth of sponge lead, said addition agent being extracted from hardwood and having the characteristic of increasing the electrical capacity of the negative plates at low ambient temperatures while not substantially affecting the density of the plate paste.

Further objects and advantages of the present invention as herein disclosed, constitute a preferred form, it is to be understood that other forms might be adopted, all coming within the scope of the claims which follow.

What is claimed is as follows:

In the drawing the single figure is a flow chart indicating the steps in the processes of obtaining sulphonated hardwood lignins and their salts.

It has heretofore been proposed to utilize ligno sulphonic acid as an addition agent for the negative plate paste of lead storage batteries. Such ligno sulphonic acid has either been used in the combined state with various other ingredients or in a substantially pure state, and in both instances has been a product obtained from waste sulphite liquor of the paper mills. This waste sulphite liquor is obtained from the digestion of coniferous woods such as hemlock and spruce, etc., with solutions of calcium bi-sulphite and/or sulphurous acid. By this process the cellulose is separated from the remaining constituents of wood and is used in the manufacture of paper while the waste liquor is a by-product and as herein explained is often used for a battery paste addition agent. It has been found that ligno sulphonic acid in the substantially pure state yields better results in the battery paste than can be obtained by the use of the waste liquor without purification.

The present invention is based upon the discovery that the sulphonated products of the lignins of hardwood have highly superior reactions as addition agents in storage battery paste over the lignins of soft or coniferous woods as heretofore utilized. While much research has been carried on lignins of coniferous wood there has been but very little investigation into the characteristics of the lignins of hardwoods. In the descriptive matter of this invention we will refer to the sulphonated lignins of hardwood as lignin sulphonic acid as differentiated from ligno sulphonic acid, the sulphonated product of the lignins of coniferous woods.

It has been found that lignin sulphonic acid in very small quantities, for example from .02% to 1% when added to the negative plate paste of lead storage batteries substantially prevents crystal growth of sponge lead in the negative plate. We have further found that lignin sulphonic acid has a higher degree of effectiveness for increasing the electrical capacity at low ambient temperatures of the negative plate than any of the addition agents heretofore proposed. Furthermore, lignin sulphonic acid is less soluble in water or acids and has a higher degree of stability to the effect of heat than has ligno sulphonic acid as made from coniferous woods.

Our discovery of the many beneficial effects obtained through the use of lignin sulphonic acid makes possible the production of an improved storage battery plate having high electrical capacity over a wide range of temperatures and which is not deteriorated by crystal growth of sponge lead therein.

It has been found by actual tests that a battery, including hardwood lignin sulphonic acid as an addition agent to the negative plate paste, has 10% greater electrical capacity at 0° F. than a similar type battery tested under identical conditions but utilizing ligno sulphonic acid from coniferous woods as the addition agent. This improvement in operating characteristics is even further amplified by the fact that the second mentioned battery had 7% by weight more material on the negative plates.

X-ray analyses on negative plates conclusively show that the lead particles therein have a constant growth when no agent is used, such growth gradually deteriorating the plate and lessening its electrical capacity. When lignin sulphonic acid is used as an addition agent, in varying small percentages the growth of the lead crystals is inhibited and substantially prevented throughout the life of the battery plate. X-ray analyses also show that small additions of lignin sulphonic acid substantially prevent crystal growth of the lead sulphate crystals as produced by the discharge of the plates during operation of the battery.

The sulphonated lignins of hardwood as hereintofore mentioned have improved characteristics over the sulphonated lignins of soft wood. We attribute this increase in effectiveness to the fact that the lignins have a different structure than the lignins of soft wood, which structural difference carries over into the sulphonated product thereof and thus causes the harwood lignin sulphonic acid to have different and improved chemical properties over ligno sulphonic acid as derived from coniferous woods.

The preferred method of making lignin sulphonic acid is as follows: 10 lbs. of hardwood, for example red oak, beech, aspen, maple, etc., sawdust, is boiled for a period of three hours in 7 gallons of a weak mineral acid solution, preferably 3% sulphuric acid solution. Phosphoric, hydrochloric or nitric acid may be used, but their use requires exacting control procedure which is unnecessary when using sulphuric acid. This treatment dissolves out the sugars, tannins, carbohydrates and resins which occur as constituents of the wood. This mixture is filtered and the insoluble residue which amounts to about 7½ lbs. is washed, the filtrate usually about 25% by weight of the sawdust used, is discarded. The insoluble residue consisting substantially of cellulose and lignin is next digested in 4 gallons of a solution containing free $SO_2$, or in a sulphurous acid solution or by any other well known method, under 60 lbs. per square inch pressure and for a period of approximately 12 hours. This digestion causes the sulphonation of the hardwood lignin rendering it soluble, while the cellulose remains substantially insoluble. The mixture is filtered and the cellulose residue is discarded. The filtrate consists of about 4 gallons of hardwood lignin sulphonic acid in a concentration of about 7½%. This solution also contains a small quantity of hemicelluloses which are rendered soluble by the sulphonation process. The filtrate is preferably evaporated to approximately ½ its original volume or two gallons, and to this solution is added two gallons of 40% sulphuric acid solution. The resultant mixture will therefore contain about 25% sulphuric acid which brings the acidity of the solution sufficiently high to precipitate the greater part of the lignin sulphonic acid. The solution is filtered and the precipitate is washed with 20% sulphuric acid solution in which it is insoluble. The filtrate is discarded.

The precipitated lignin sulphonic acid amounts to approximately 2 lbs. and can be mixed directly in the negative plate paste, or in the preferred form, is dissolved in water and the water solution thereof is added to the negative paste. Usually 0.2% to 0.3% by weight of lignin sulphonic acid gives the optimum results in battery performance although greater amounts may be used. An alternative method of adding the material to the paste is to immerse the dried negative plate (before formation) in a 10% water solution of hardwood lignin sulphonic acid in which instance the plate paste absorbs the lignin sulphonic acid to provide substantially similar results.

An alternative method of removing sugars, tannins carbohydrates and resins from the hardwood sawdust is to use 10 gallons of caustic solution, preferably a 1% sodium hydroxide solution for each 10 lbs. of hardwood sawdust, and treat the sawdust therein for a period of 15 hours at room temperature. After filtering and washing the residue undergoes a procedure similar to that hereinbefore described.

Another modification in the use of the addition agent is to chemically react the hardwood lignin sulphonic acid with a metal hydroxide whereupon sulphonates are formed. For example, barium hydroxide may be used or any other hydroxide of the alkaline earth metals, or oxides or hydroxides of the heavy metals preferably lead. Preferably barium hydroxide is added to an aqueous solution of hardwood lignin sulphonic acid at room temperature and in quantities sufficient to neutralize the solution. This procedure causes precipitation of the barium salt of lignin sulphonic acid which makes an excellent addition agent for the negative plate paste, since with the addition of sulphuric acid used in formation of the plate, the barium salt is decomposed to form barium sulphate, whereupon the hardwood lignin sulphonic acid is set free. Both of these materials are well dispersed throughout the negative material.

We have found that when making an addition agent in accordance with the procedure outlined herein, that such an addition agent does not increase the density or weight of the plate paste and is therefore highly desirable therein.

While specific quantities and concentrations of ingredients have been specified throughout the description of chemical process used in forming hardwood lignin sulphonic acid, such quantities and concentrations are not limiting, but are merely set forth for illustrative purposes. Variation in the quantities and concentrations of the ingredients may be made without departing from the spirit of our invention so long as the desired results are obtained.

While the embodiment of the present invention as herein disclosed, constitutes a preferred form, it is to be understood that other forms might be adopted, all coming within the scope of the claims which follow.

What is claimed is as follows:

1. The process of obtaining hardwood lignin sulphonic acid in a substantially pure state comprising the steps of, boiling hardwood with dilute sulphuric acid, sulphonating the residue and thereby forming soluble substantially pure lignin sulphonic acid, and then separating the lignin sulphonic acid from the insoluble residue.

2. The process of obtaining hardwood lignin sulphonic acid in a substantially pure state comprising the steps of, boiling hardwood with a diluted mineral acid solution for dissolving out certain undesirable soluble constituents, sulphonating the residue and thereby forming soluble substantially pure lignin sulphonic acid, and then separating the ligning sulphonic acid in the substantially pure state from the insoluble residue.

3. The process of obtaining hardwood lignin sulphonic acid in a substantially pure state comprising the steps of, boiling the hardwood with a diluted sulphuric acid for dissolving out the carbohydrates, tannins and resins, sulphonating the residue and thereby forming soluble substantially pure lignin sulphonic acid, separating the lignin sulphonic acid from the insoluble residue, and then forming a sulphonate by the addition of a basic inorganic compound.

4. The process of obtaining hardwood lignin sulphonic acid in a substantially pure state comprising the steps of boiling hardwood with dilute sulphuric acid in a concentration of about 3% by weight, sulphonating the residue and thereby forming soluble substantially pure lignin sulphonic acid, and then separating the lignin sulphonic acid from the insoluble residue.

HOWARD B. BIRT.
WILLIAM C. PRITCHARD.
ROBERT A. DAILY.